(12) United States Patent
Ni et al.

(10) Patent No.: US 10,605,476 B2
(45) Date of Patent: Mar. 31, 2020

(54) MONITORING CIRCUIT AND MONITORING APPARATUS INCLUDING THE MONITORING CIRCUIT

(71) Applicant: Wenzhou MTLC Electric Co, Ltd., Yueqing, Zhejiang (CN)

(72) Inventors: Lidong Ni, Yueqing (CN); Wei Gao, Zhejiang (CN)

(73) Assignee: Wenzhou MTLC Electric Appliances Co., Ltd, Yueqing, Zhejiang Province (CN)

(*) Notice: Subject to any disclaimer, the term of this patent is extended or adjusted under 35 U.S.C. 154(b) by 213 days.

(21) Appl. No.: 14/922,820

(22) Filed: Oct. 26, 2015

(65) Prior Publication Data
US 2017/0115021 A1   Apr. 27, 2017

(51) Int. Cl.
| | |
|---|---|
| *F24F 11/77* | (2018.01) |
| *F24F 11/30* | (2018.01) |
| *F24F 110/20* | (2018.01) |
| *F24F 120/10* | (2018.01) |

(52) U.S. Cl.
CPC ............ *F24F 11/77* (2018.01); *F24F 11/30* (2018.01); *F24F 2110/20* (2018.01); *F24F 2120/10* (2018.01); *Y02B 30/746* (2013.01)

(58) Field of Classification Search
USPC ...................................................... 236/44 A
See application file for complete search history.

(56) References Cited

U.S. PATENT DOCUMENTS

| | | | | |
|---|---|---|---|---|
| 3,869,529 A | * | 3/1975 | Follette | F24F 3/14 236/44 C |
| 4,546,988 A | * | 10/1985 | Gailey | B23B 31/16275 279/123 |
| 5,113,317 A | * | 5/1992 | Howe | H05K 7/1418 361/756 |
| 5,227,956 A | * | 7/1993 | Johnson | H04M 1/02 361/736 |
| 5,713,655 A | * | 2/1998 | Blackman | F21S 9/022 200/312 |
| 5,735,918 A | * | 4/1998 | Barradas | A61L 9/122 422/124 |
| 6,935,570 B2 | * | 8/2005 | Acker, Jr. | F24F 11/0001 236/44 R |
| 2002/0088968 A1 | * | 7/2002 | Bebendorf | E04H 17/168 256/24 |

(Continued)

*Primary Examiner* — Henry T Crenshaw
(74) *Attorney, Agent, or Firm* — Ziegler IP Law Group, LLC.

(57) ABSTRACT

A monitoring apparatus includes a detecting unit with a humidity sensor configured to sense humidity and output a corresponding humidity signal. A controller is configured to receive the humidity signal and output a ventilation control signal when the humidity signal exceeds a preset humidity threshold. A first driving unit is configured to receive the ventilation control signal and drive a ventilation device. The monitoring apparatus detects a humidity condition in an environment with a humidity sensor. When the humidity signal exceeds the preset humidity threshold, such as when the humidity is high, a ventilation control signal is output by the controller to control the first driving unit to drive the ventilation device. When the humidity is low the ventilation device is turned off.

8 Claims, 6 Drawing Sheets

(56) References Cited

U.S. PATENT DOCUMENTS

| | | | | |
|---|---|---|---|---|
| 2004/0042168 | A1* | 3/2004 | Yang | G06F 1/1626 361/679.33 |
| 2005/0016191 | A1* | 1/2005 | Butler | F24F 11/83 62/158 |
| 2005/0252983 | A1* | 11/2005 | Acker, Jr. | F24F 11/0001 236/44 R |
| 2010/0006661 | A1* | 1/2010 | Goodwin | F24F 7/065 236/44 A |
| 2010/0171889 | A1* | 7/2010 | Pantel | G02F 1/133308 349/1 |
| 2011/0154985 | A1* | 6/2011 | Mittelmark | A01G 27/00 95/1 |
| 2013/0058060 | A1* | 3/2013 | Jang | D06F 39/005 361/759 |
| 2013/0255297 | A1* | 10/2013 | Matsuoka | F25B 49/02 62/180 |
| 2013/0261799 | A1* | 10/2013 | Kuhlmann | G05B 13/02 700/275 |
| 2014/0319236 | A1* | 10/2014 | Novotny | G05D 23/19 236/1 C |

* cited by examiner

MONITORING CIRCUIT AND MONITORING APPARATUS INCLUDING THE MONITORING CIRCUIT

FIELD

The aspects of the disclosed embodiments relate to the field of monitoring technologies, and in particular, to a monitoring circuit and monitoring apparatus including the monitoring circuit.

BACKGROUND

To improve the environment of an enclosed or confined space, such as a room, a ventilation device, such as an exhaust fan for removing humidity and increasing ventilation, may be disposed in the space. However, humidity and contaminants in the enclosed space will change over time.

Consider a bathroom, for example. When a person just enters the bathroom to shower, the humidity in the bathroom may not be high. Thus, even if the exhaust fan is not turned on, the person will not feel discomfort. However, as the person showers, the humidity in the bathroom will tend to gradually increase. In this case, the exhaust fan will usually be turned on to remove the humidity. Therefore, there is a tendency for a person when entering the bathroom, to turn on the ventilation device such as the exhaust fan. In some cases, the ventilation unit may be left on even after the person leaves the bathroom, which undoubtedly wastes energy.

It would be advantageous to be able to monitor humidity in the enclosed space and adjust the environment in the enclosed space.

Accordingly, it would be desirable to provide an apparatus that addresses at least some of the problems identified above.

SUMMARY

As described herein, the exemplary embodiments overcome one or more of the above or other disadvantages known in the art.

One aspect of the disclosed embodiments is directed to a monitoring circuit, which includes a detecting unit and a humidity sensor configured to sense a humidity level and output a corresponding humidity signal. A controller is configured to receive the humidity signal and output a ventilation control signal when the humidity signal exceeds a preset humidity threshold. A first driving unit is configured to receive the ventilation control signal and drive a ventilation device. The monitoring circuit of the disclosed embodiments can detect a humidity condition in an environment with a humidity sensor. When the signal from the humidity sensor exceeds a preset or predetermined humidity threshold, such as when the humidity level is high, the monitoring circuit outputs the ventilation control signal by means of the controller so as to control the first driving unit to drive the ventilation device. When the detected humidity level is low, the monitoring circuit is configured to turn the ventilation device off, thereby reducing energy consumption while ensuring a comfortable environment and experience.

In one embodiment, the detecting unit of the monitoring circuit of the disclosed embodiments further includes an infrared sensor configured to detect whether there is someone entering in an infrared detection range, i.e. motion, and output a corresponding detection signal. The controller is configured to receive the detection signal, and one or more of control the ventilation unit and a lighting device. In one embodiment, upon detection of motion, the controller is configured to output a detection or occupancy control signal. The occupancy control signal can drive a first driving unit to activate the ventilation unit, or turn the fan on.

In one embodiment, detection of motion can cause the controller to output a lighting control signal when it is acquired through the detection signal that there is motion, or someone has entered the confined space or area. A second driving unit is configured to receive the lighting control signal and then drive a lighting device. The monitoring circuit of the disclosed embodiments can detect, through the infrared sensor, whether there is someone entering a room, and once it is detected that there is someone entering, the controller outputs the lighting control signal to control the second driving unit to drive the lighting device. Therefore, it is unnecessary for a user to turn on the lighting device manually, thereby improving the user experience including saving energy.

In another embodiment, the aspects of the disclosed embodiments further provides a monitoring apparatus including the monitoring circuit, the monitoring circuit including a bottom case, where the monitoring circuit is disposed in the bottom case; a bottom cover disposed on the bottom case; and a plurality of through holes disposed on the bottom case and/or the bottom cover. The monitoring apparatus of the disclosed embodiments protects the monitoring circuit by using a space enclosed by the bottom case and the bottom cover, and by means of the plurality of through holes disposed on the bottom case and/or bottom cover, ensures that the detecting unit in the monitoring circuit can contact with the ambient environment for detection, which is quite convenient.

In a further embodiment, the monitoring apparatus of the disclosed embodiments further includes a control panel, provided with one or more keys; the bottom cover, provided with one or more connection portions coupled to the controller in the monitoring circuit, which are correspondingly coupled to the keys in a one-to-one manner. The monitoring apparatus of the disclosed embodiments takes full consideration of user requirements, assures that the humidity level in the environment, such as a room or other confined space, does not exceed a preset value. When the user wants to turn on the ventilation device or lighting device, the user will press the key that has a corresponding operation mark; a connection portion coupled to the key will transmit such key information to the controller, and the controller will start a corresponding device according to the key information to perform ventilation or lighting, thereby further improving the user experience.

In one embodiment, the bottom cover of the monitoring apparatus is further provided with one or more grooves, each of the grooves being provided with a snap portion formed therein. The control panel is further provided with protrusions corresponding one-to-one with the grooves. After sliding in the corresponding grooves, the protrusions are snapped into the snap portions in the grooves, thereby fixing the control panel to the bottom cover. The control panel may be detachably mounted on the bottom cover in the above manner, and during mounting, the protrusions on the control panel are correspondingly put into the grooves on the bottom cover and are pushed into the snap portions in the grooves, or slide ways in the grooves, so as to be snapped into the snap portions, thereby fixing the control panel on the bottom cover. During detaching, the control panel is pushed in an opposite direction along the slide ways in the grooves, so that the protrusions on the control panel are separated from the snap portions, and the control panel is taken from the bottom cover. Therefore, the mounting and detaching are both convenient.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DESCRIPTION OF THE DRAWINGS

In order that the aspects of the disclosed embodiments are understood more easily and clearly, the aspects of the disclosed embodiments are further described in details through specific embodiments and accompanying drawings, wherein.

In the drawings, the reference numerals are generally indicated as follows: 1—detecting unit, 2—controller, 3—first driving unit, 4—second driving unit, 5—ventilation device, 6—ligthing device, 11—humidity sensor, 13—infrared sensor, 31—first relay, 41—second relay, 51—monitoring circuit PCB, 52—bottom case, 53—bottom cover, 54—through hole, 55—control panel, monitoring circuit 100, 102—humidity signal, 104—carbon monoxide signal, 106—infrared sensor motion detection signal, 202—ventilation control signal, 204—lighting control signal, 500—monitoring apparatus, 531—connection portion, 532—groove, 551—key, 552—protrusion.

DETAILED DESCRIPTION

The aspects of the disclosed embodiments provide a monitoring apparatus for monitoring the humidity levels in an environment, such as a confined space. One example of such a confined space is a bathroom or shower. A ventilation device, such as an exhaust fan, is automatically controlled by a humidity sensor. In one embodiment, the operation of the fan is controlled based on the detected humidity level. For example, when the monitoring apparatus detects a high humidity condition, the monitoring apparatus is configured to enable the fan to remain on in order to alleviate the high humidity condition or state. In this example, the fan is activated based on a detected occupancy of the room.

In one embodiment, the monitoring apparatus can also include a light that is controlled by a sensor, such as a PIR sensor. The monitoring apparatus can manually turn the light on and automatically off based on a detected occupancy.

Figure 1:
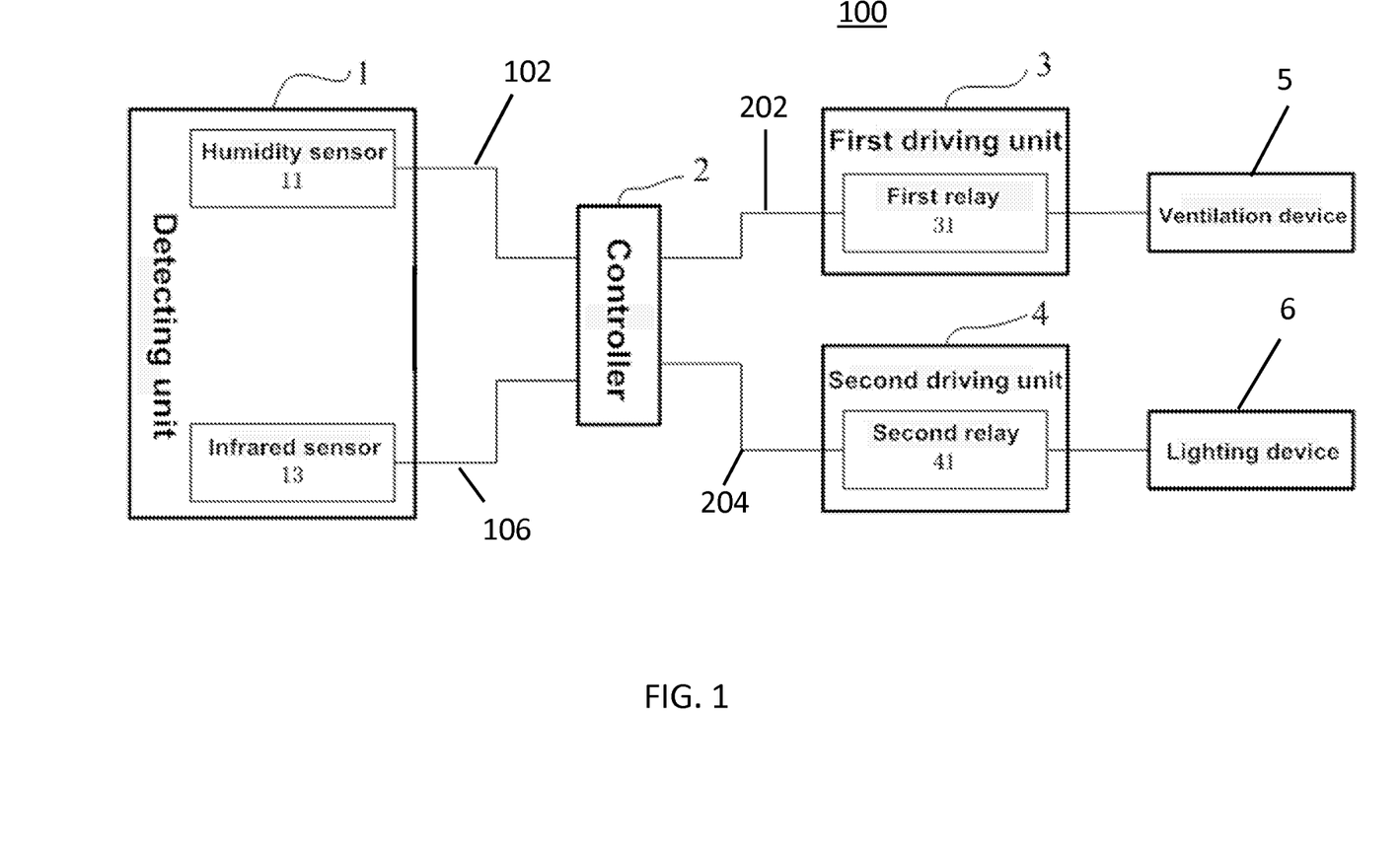
FIG. 1 is a block diagram of a monitoring circuit incorporating aspects of the disclosed embodiments.

Referring to FIG. 1, in one embodiment, a monitoring circuit 100 is provided. The monitoring circuit 100 in this example includes a detecting unit 1, a controller 2, a first driving unit 3 and a second driving unit 4. In the example of FIG. 1, the detecting unit 1 includes a humidity sensor 11 configured to sense humidity or a humidity level and output a corresponding humidity signal 102. The controller 2 is configured to receive the humidity signal 102 from the detecting unit 1 and output a ventilation control signal 202 when the humidity signal 102 exceeds a preset humidity threshold. The first driving unit 3 is configured to receive the ventilation control signal 202 and drive or enable a ventilation device 5, such as an exhaust fan.

Specifically, the monitoring circuit 100 in this embodiment can detect a humidity condition in an environment, such as a room, by means of the humidity sensor 11. The monitoring circuit 100 can detect when the humidity exceeds the preset humidity threshold, that is, when the humidity is high. A state of the humidity signal 102 is dependent upon the detected humidity level.

Referring again to FIG. 1, in one embodiment the detecting unit 1 may further include an infrared sensor 13. The infrared sensor 13 is configured to detect whether there is motion or someone is entering in an infrared detection range, and output a corresponding infrared or motion detection signal 106. In this example, the controller 2 is configured to receive the motion detection signal 106, also referred to as an occupancy signal, and output one or more of the ventilation control signal 202 and a lighting control signal 204. The ventilation control signal 202 and the lighting control signal 204 are configured to be activated when it is detected that there is movement within the room, such as when someone enters the room, for example.

In one embodiment, upon detection of movement, such as a person entering the room, the first driving unit 3 receives the ventilation control signal 202. The first driving unit 3 is configured to enable or activate the ventilation device 5. The ventilation control signal 202 is output by the controller 2 so as to control the first driving unit 3 to drive the ventilation device 5.

In an embodiment where the ventilation device 5 is on or active, and it is determined that the detected humidity level is low or below the preset or predetermined humidity threshold, the controller 2 is configured to turn off the ventilation device 5, thereby reducing energy consumption while ensuring a comfortable experience for the user.

In one embodiment, the first driving unit 3 includes a first relay 31. The first relay 31 receives or is responsive to a state of the ventilation control signal 202. In a first state of the ventilation control signal 202, the first relay 31 is configured to one or more of turn on a power supply circuit or enable the power supply circuit (not shown) of the ventilation device 5. For example, if the ventilation device 5 is on or active, the ventilation control signal 202 can maintain the ventilation device 5 in the on or active state.

In another state of the ventilation control signal 202, the first relay 31 is switched to turn off or disable the power supply circuit of the ventilation device 5. This can occur when the first relay 31 is not receiving the ventilation control signal 202, such as when the humidity level, as detected by the humidity sensor, drops below a pre-determined value.

In one embodiment, the first relay 31 may implement control on a high-voltage and strong-current circuit by using a low voltage and a weak current. This enhances the safety and accuracy of the monitoring circuit 100.

In one embodiment, the second driving unit 4 is configured to receive the lighting control signal 204. The second driving unit 4 is configured to drive or energize a lighting device 6. As noted above, when motion is detected, the lighting device 6 is turned on.

The monitoring circuit 100 of the disclosed embodiments is configured to detect, through the infrared sensor 13, whether there is someone entering a room. Once it is detected that there is someone entering, the controller 2 outputs the lighting control signal 204 to control the second driving unit 4 to drive the lighting device 6. Therefore, it is unnecessary for a user to turn on the lighting device 6 manually for lighting, thereby improving the user experience. When movement or motion is not detected, the lighting device 6 can be automatically turned off, which can result in saving electrical energy.

In one embodiment, as shown in FIG. 1, the second driving unit 4 may include a second relay 41. The second relay 41 is configured to receive the lighting control signal 204, and responsive to a state of the lighting control signal 204, turn on or enable a power supply circuit (not shown) of the lighting device 6. In one embodiment, the second relay 41 turns off the power supply circuit of the lighting device 6 responsive to a state of the lighting control signal 204, such as when not receiving the lighting control signal 204. The second relay 41 may implement control on a high-voltage and strong-current circuit by using a low voltage and a weak current. This provides a safe and accurate control.

Figure 2:
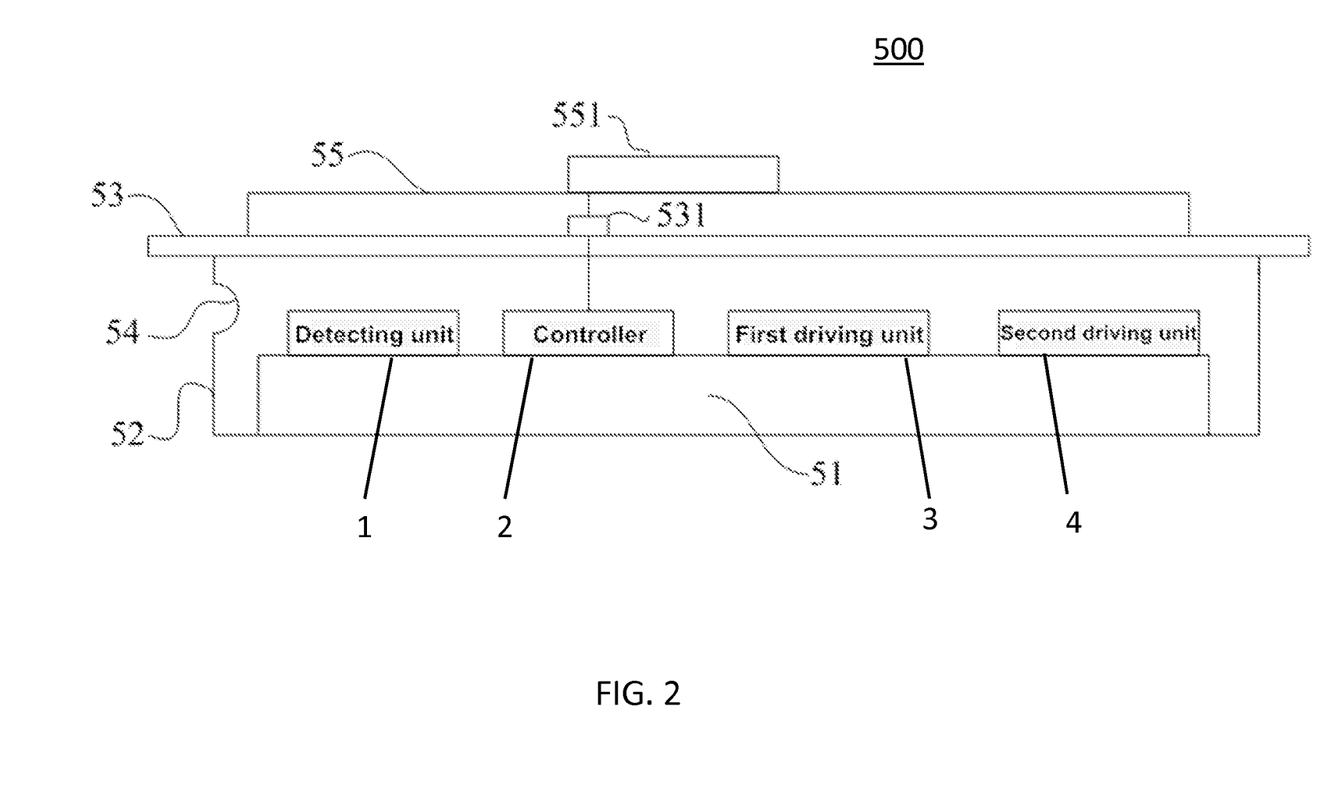
FIG. 2 is a sectional side view of a monitoring apparatus incorporating aspects of the disclosed embodiments.

FIG. 2 illustrates a sectional side view of a monitoring apparatus 500 incorporating aspects of the disclosed embodiments. In this example, the monitoring apparatus 500 including the monitoring circuit 100 of FIG. 1 as disposed on a monitoring circuit assembly board 51, such as a printed circuit board (PCB). The monitoring apparatus 500 further includes a bottom case 52, a bottom cover 53 and a plurality of through holes 54. In this example, the monitoring circuit assembly board 51 is disposed in the bottom case 52. The bottom cover 53 is disposed on the bottom case 52. The plurality of through holes 54 is disposed on or in the bottom case 52 and/or the bottom cover 53.

The monitoring apparatus 500 of the disclosed embodiments protects the monitoring circuit board assembly 51 by using a space enclosed by the bottom case 52 and the bottom cover 53. The plurality of through holes 54 disposed on the bottom case 52 and/or the bottom cover 53 ensures that the detecting unit 1 in the monitoring circuit 100 can come in contact with or be exposed to the ambient environment for detection, which is quite convenient.

Figure 3:
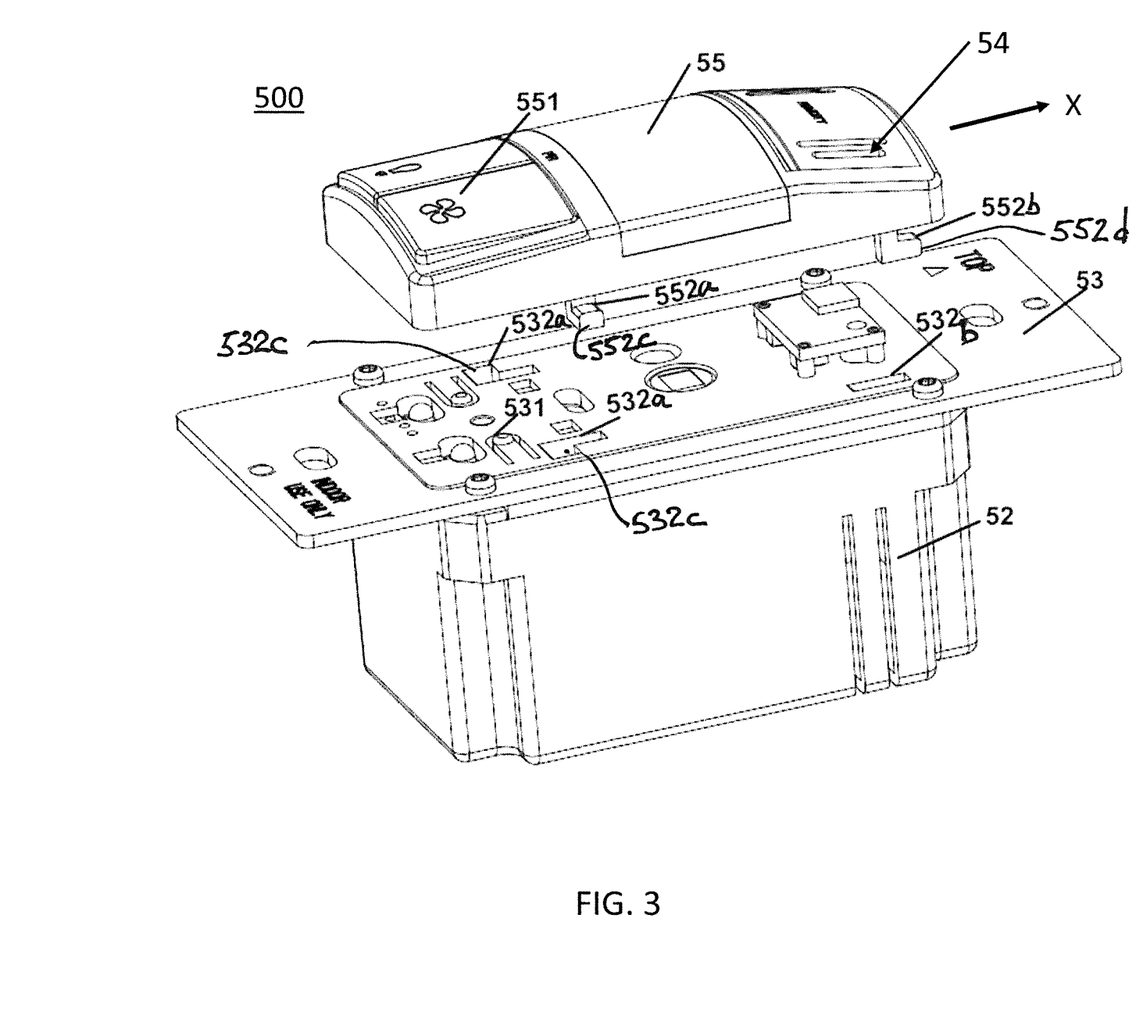
FIG. 3 is a perspective assembly view of a control panel for a monitoring apparatus incorporating aspects of the disclosed embodiments.
Figure 4:
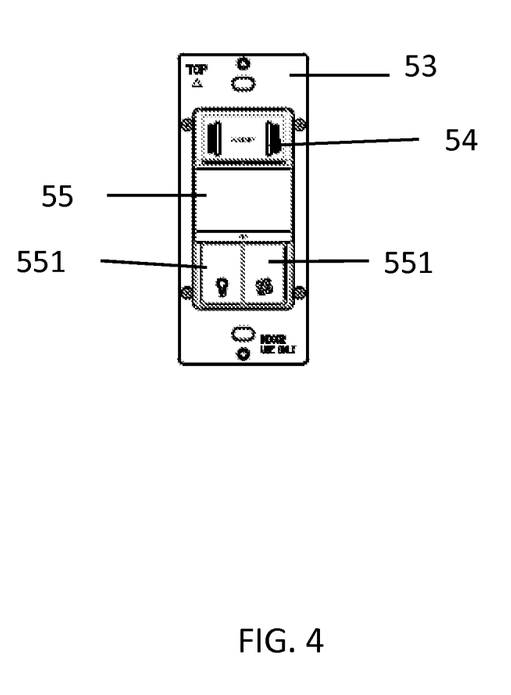
FIG. 4 is a front view of a monitoring apparatus incorporating aspects of the disclosed embodiments.
Figure 5:
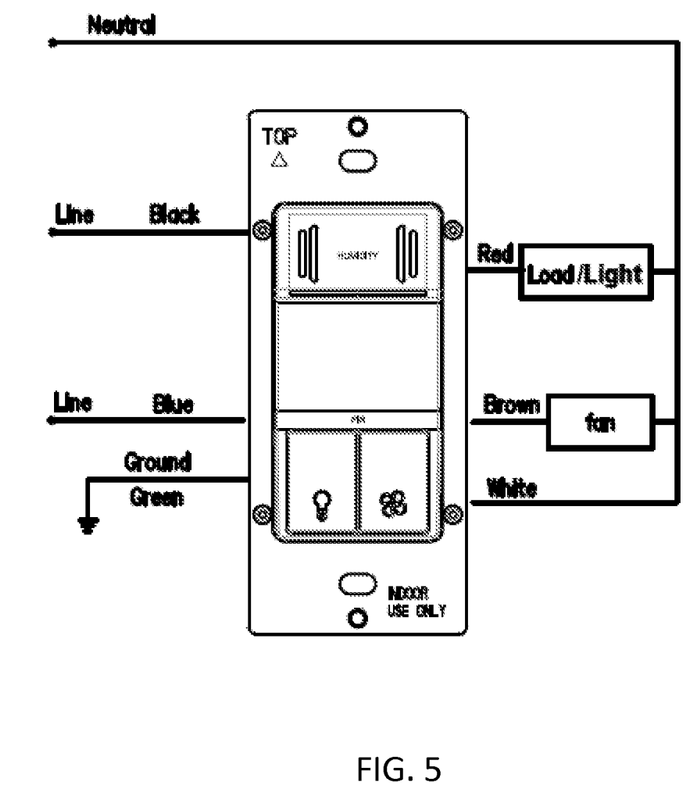
FIG. 5 is a wiring diagram for a monitoring apparatus incorporating aspects of the disclosed embodiments.

Referring to FIGS. 1 and 2, in one embodiment, the monitoring apparatus 500 may further include a control panel 55, provided with one or more manually activated keys or buttons 551. In the example of FIG. 3, two keys 551 are shown, one for the ventilation device 5 and another for the lighting device 6. The keys 551 in this example are manually activated push buttons that are manually activated to energize the corresponding ventilation device 5 or lighting device 6. In alternate embodiments, the monitoring device 500 can include any suitable number of keys, other than including two. When the user presses any key 551, the controller 2 in the monitoring circuit 100 will drive the corresponding device according to a key signal. The bottom cover 53 is provided with one or more connection portions 531 coupled to the controller 2 in the monitoring circuit 100, which are correspondingly coupled to the keys 551 in a one-to-one manner.

The monitoring apparatus 500 of the disclosed embodiments takes into full consideration user requirements by monitoring the humidity level in the environment and assuring that it does not exceeds a preset value, generally in an automated manner. However, if the detecting unit 1 fails, or if the user wants to turn on the ventilation device 5 or lighting device 6, the user will press the corresponding key 551. A connection portion 531 coupled to the corresponding key 551 will transmit such key information to the controller 2 in the monitoring circuit 100. The controller 2 will start the device 5 or 6 corresponding to the key information to perform ventilation or lighting, thereby further improving the user experience.

Referring to FIG. 3, in one embodiment, the bottom cover 53 of monitoring apparatus 500 of this embodiment is further provided with one or more grooves 532a and 532b. The grooves 532a are provided with a snap portion formed therein. Grooves 532a include a portion 532c to accommodate member 552c of protrusions 552a. Protrusion 552a is angled at about 90 degrees relative to protrusion 552b. Thus member 552c extends in one direction and member 552 in another direction. The control panel 55 is provided with protrusions 552a and 552b corresponding one-to-one with the grooves 532a and 532b. After sliding the protrusions 552a into corresponding grooves 532a, the protrusion 552a is snapped or locked into the snap portions in the groove 532a. This fixes the control panel 55 on the bottom cover 53.

As shown in FIG. 3, the control panel 55 may be detachably mounted on the bottom cover 53 in the above manner. During mounting, the protrusions 552a and 552b extending from the control panel 55 are correspondingly put into or inserted into the grooves 532a and 532b on the bottom cover 53. The protrusions 552a are pushed into the snap portions in the grooves 532a and the control panel 55 is slid in direction X with protrusions 552a and 552b in the respective grooves 532a and 532b—so that the protrusions 552a engage or are snapped into the snap portions, thereby fixing the control panel 55 on the bottom cover 53. During detaching, the control panel 55 is pushed or slid in an opposite direction along the grooves 532a and 532b, so that the protrusions 552a and 552b on the control panel 55 are separated from the snap portions, and the control panel 55 is able to be removed from the bottom cover 53. Therefore, the mounting and detaching or the control panel 55 and bottom cover 53 is simple and convenient.

Figure 6:
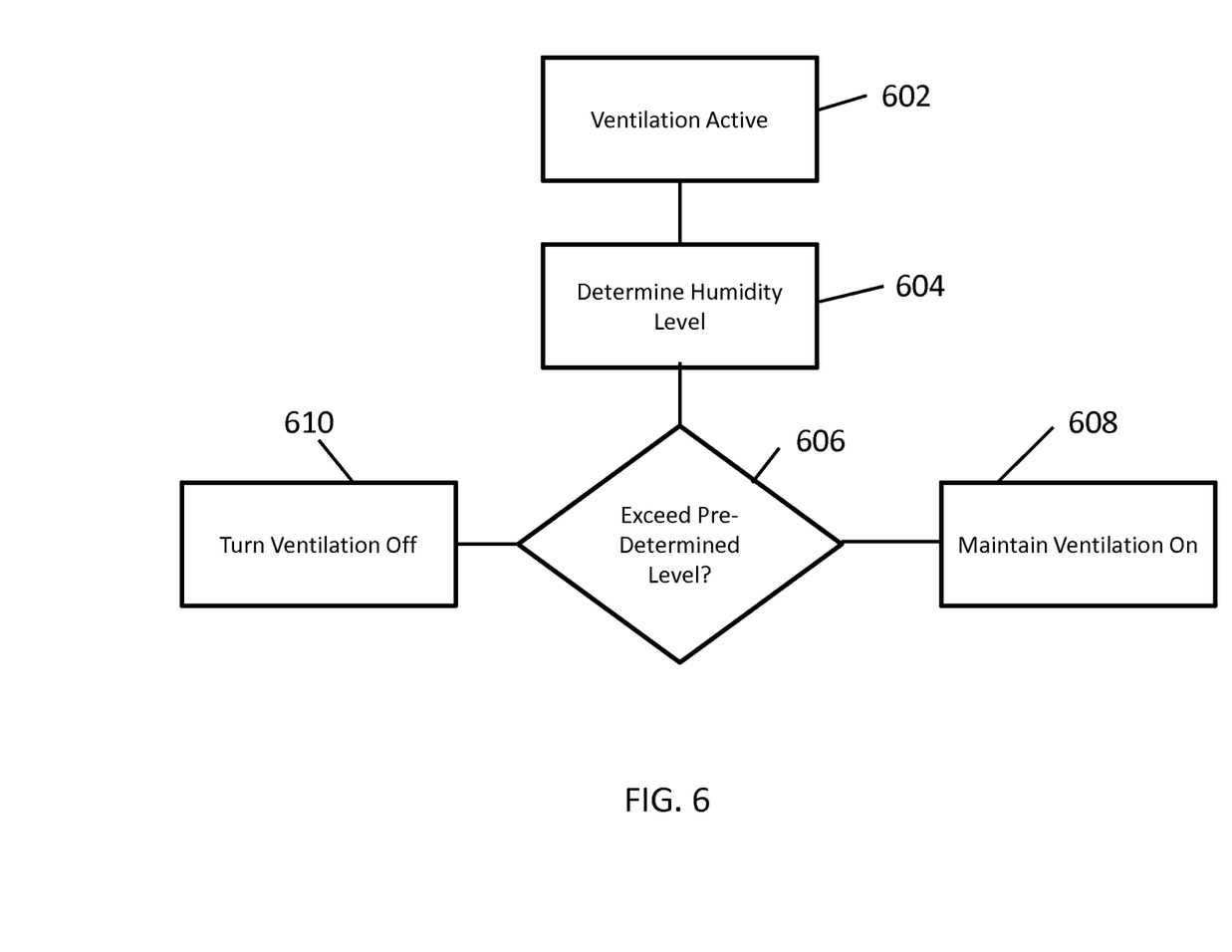
FIG. 6 is a flow chart illustrating one embodiment of a process incorporating aspects of the present disclosure.

FIG. 6 is a flowchart illustrating one embodiment of a method incorporating aspects of the present disclosure. In this example, the ventilation device or system 5 is triggered 602 by the detection of motion or manual activation. The trigger 602 is configured to cause the ventilation device 5 to turn or switch on. The humidity level is determined 604. If the humidity level is determined 606 to exceed a pre-determined value, the ventilation device 5 is maintained 608 in the active or ON state. If the humidity level is determined 606 not to exceed the pre-determined value, the ventilation device 5 can revert or switch 610 to a non-active or OFF state when movement is not detected or the ventilation device 5 is powered OFF. In one embodiment, the ventilation device 5 must be in the active or ON state, when the humidity level is detected, in order to maintain the ventilation device in the ON state. In this example, the ventilation device 5 is turned on when motion or movement is detected. Then, the humidity level is detected and it is determined whether to keep the ventilation device 5 in the ON state.

The aspects of the disclosed embodiments use a motion detector, such as a PIR sensor, as a trigger when movement is detected and turn an exhaust fan in a confined space ON. A humidity sensor can then be used to determine a humidity level in the confined space. If the humidity level is below a preset level, the fan can be turned OFF. If the humidity level is above a present level, the fan is maintained ON.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A monitoring and control apparatus for a room that includes a lighting device and ventilation device, comprising:
    a housing comprising a control panel on a front side of the housing and a bottom case member on a back side of the housing, a cover member disposed between the control panel and the bottom case member, a width of the cover member being greater than a width of the control panel;
    a detecting unit disposed in a space of the bottom case member, a bottom cover configured to be attached to the bottom case member to enclose and protect the space;
    the control panel including two key switch devices at a first end of the control panel and a plurality of through holes at a second end of the control panel, the control panel being releasably attached to the cover member with a snap fit connection, wherein the snap fit connection comprises:
        a first L-shaped snap member and a second L-shaped member disposed on an underside of the second end of the control panel, the first L-shaped snap member being aligned in a direction parallel with a first side of the control panel and the second L-shaped snap member being aligned in a direction parallel with a second side of the control panel;
        a third L-shaped snap member and a fourth L-shaped snap member disposed on an underside of the first end of the control panel, the third L-shaped member being aligned in a direct orthogonal to the first side and the first L-shaped member, and the fourth L-shaped member being aligned in a direction orthogonal to the second side and the second L-shaped member;
    wherein the detecting unit comprises a motion detector and a humidity sensor, the motion detector configured to detect motion and output a motion signal, the humidity sensor configured to sense a humidity level and output a corresponding humidity signal;
    a controller configured to receive the motion signal and output a ventilation control signal;
    a first driving unit with a first relay device, the first driving unit connected to the controller and configured to receive the ventilation control signal and switch the first relay device to drive the ventilation device;
    a second driving unit with a second relay device, the second driving unit connected to the controller and configured to receive the motion signal and switch the second relay device to drive the lighting device, wherein the controller is further configured to:
        receive a first signal to activate the ventilation device;
        determine, after receipt of the first signal an activation of the ventilation device, whether the humidity signal is above or below a predetermined humidity level; and
        if the humidity level is above the predetermined humidity level, maintain the ventilation device in an activated state; or
        if the humidity level is below the predetermined humidity level, deactivate the ventilation device,
        wherein the first signal is one or more of a manual activation signal from one of the one or more keys or the motion signal.

2. The monitoring and control apparatus according to claim 1, wherein the first relay is configured to switch electrical power to the ventilation device in an enabled state of the ventilation device.

3. The monitoring and control apparatus according to claim 2, wherein the first relay is configured to switch the ventilation device off in a disabled or deactivated state of the ventilation device.

4. The monitoring and control apparatus according to claim 3, wherein the motion detector comprises an infrared sensor configured to detect motion within an infrared detection range and output the corresponding detection signal.

5. The monitoring and control apparatus according to claim 1, wherein the controller is configured to receive the motion signal and output a lighting control signal when the motion signal indicates motion.

6. The monitoring and control apparatus according to claim 1, wherein the second relay device is configured to receive the lighting control signal and turn on a power supply circuit of the lighting device in a first state of the lighting control signal and turn off the power supply circuit of the lighting device in a second state of the lighting control signal.

7. The monitoring and control apparatus according to claim 1 wherein to insert the control panel onto the bottom cover member, the first L-shaped tab member, the second L-shaped tab member, the third L-shaped tab member and the fourth L-shaped tab member are configured to be inserted into corresponding openings on the bottom cover member and the control panel is configured to slide in a first direction towards an end of the housing corresponding to the second end of the cover member to lock in place.

8. The monitoring and control apparatus according to claim 7, wherein the monitoring and control apparatus is disposed in a bathroom.

* * * * *